United States Patent Office 2,784,239
Patented Mar. 5, 1957

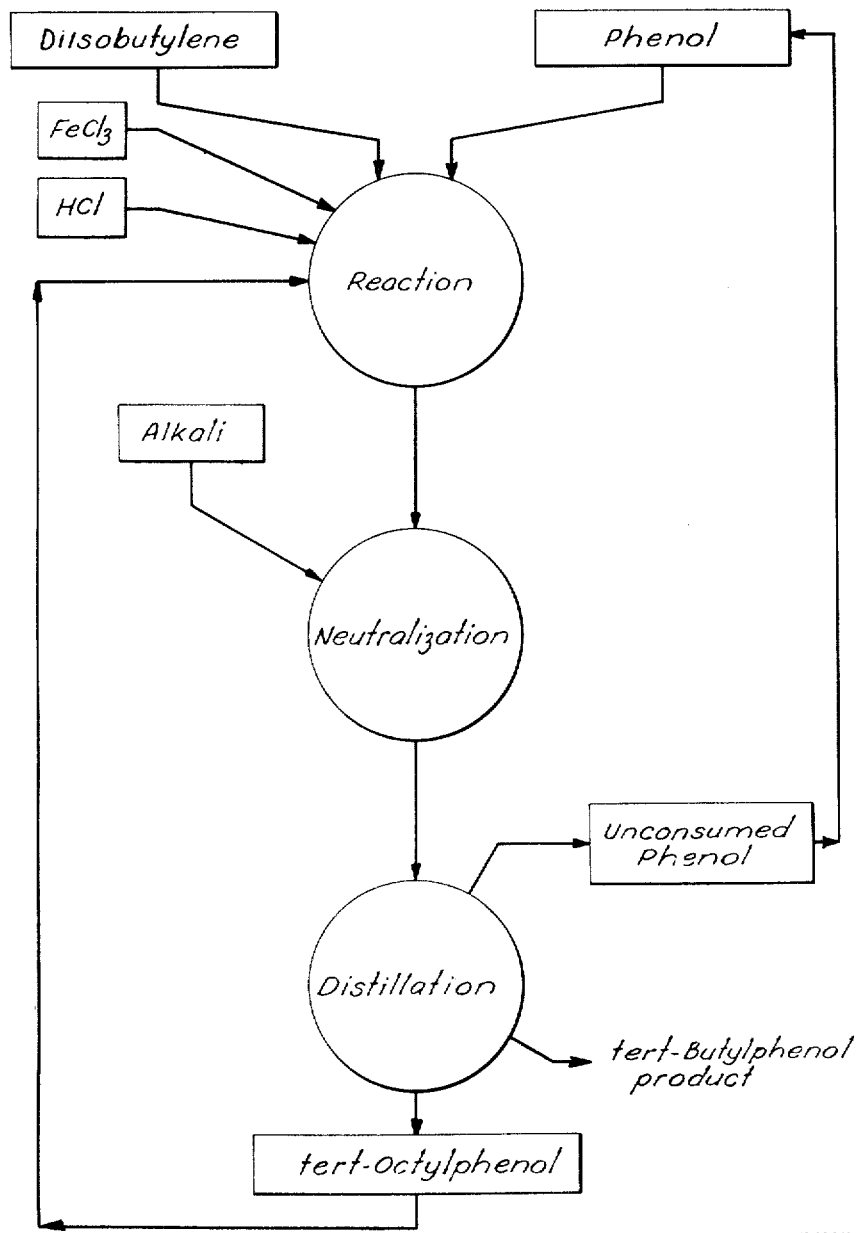

2,784,239

PROCESS FOR MAKING TERTIARY BUTYL PHENOLS

Andrew J. Dietzler and Fred Bryner, Midland, Mich., assignors to The Dow Chemical Company, Midland, Mich., a corporation of Delaware Application March 2, 1953, Serial No. 339,904

10 Claims. (Cl. 260—623)

This invention relates to the alkylation of phenols. It pertains especially to an improved procedure and catalysts for reacting diisobutylene with a phenol to form a corresponding tertiary-butylphenol.

Para-tertiary-butylphenol is usually manufactured by reaction of isobutylene, or tertiary butyl chloride, with phenol itself in the presence of a Friedel-Crafts catalyst, or other acid-acting condensing agent, such as sulfuric acid, hydrogen chloride, or an acid-activated bleaching earth. Perkins et al. in U. S. Patent No. 2,091,565 describes the preparation of mono-tertiary-butylphenol by a procedure wherein a polyisobutylene, e. g. diisobutylene, triisobutylene, or mixtures thereof, is reacted with phenol at elevated temperatures in the presence of a Friedel-Crafts catalyst such as aluminum chloride, ferric chloride, or an acid-activated bleaching earth. Upon completing the reaction the catalyst is removed in usual ways, e. g. by filtering the mixture to remove a solid catalyst, or by washing the reaction mixture with water, an aqueous solution of an alkali, or an aqueous solution of an acid, after which the teritary-butylphenol is separated by fractional distillation of the crude product.

The method heretofore proposed for making a mono-tertiary-butylphenol by reaction of a polyisobutylene with phenol has not been entirely satisfactory for the manufacture of para-tertiary-butylphenol on a commercial scale for the reason that a substantial proportion of catalyst, usually from 1 to 10 percent by weight of the phenol, is required in the reaction, and must be removed prior to separating the tertiary-butylphenol, e. g. by fractional distillation. The aforementioned operation of filtering, or of washing the crude reaction mixture, e. g. with an aqueous solution of an alkali, to remove the catalyst, is time-consuming and adds to the cost of the product.

It has now been found that mixtures of certain Friedel-Crafts catalysts and a hydrogen halide are unusually effective in catalyzing the reaction of diisobutylene with phenols to form tertiary-butylphenols, and that these mixed catalysts may satisfactorily be used in exceptionally small amounts which need not be removed, but may economically be neutralized, and the products be separated by distillation. More specifically, it has been found that mixtures of an iron halide and a hydrogen halide, e. g. mixtures of ferrous bromide, ferrous chloride, ferric bromide, or ferric chloride, and hydrogen bromide, or hydrogen chloride, are particularly effective catalysts or condensing agents for the reaction of diisobutylene with a phenol, such as phenol itself, or a substituted phenol having a free ortho or para position, to form a good yield of the corresponding tertiary-butylphenol. It has also been found that a very small proportion, based on the weight of the phenol starting material, of at least one of the aforementioned iron halides and hydrogen chloride, or hydrogen bromide, has a catalytic effect on the reaction of diisobutylene with a phenol having a hydrogen atom in at least one of the positions ortho or para to the hydroxyl group to produce a corresponding tertiary-butylphenol as the principal product, which catalytic effect is not obtained when employing the iron halide, or the hydrohalic acid, as the sole catalyst under otherwise similar reaction conditions. It has further been found that the yield of the tertiary-butylphenol, from the reaction of diisobutylene with such a phenol reactant in the presence of an iron halide, e. g. ferric chloride or ferrous bromide, and a hydrohalic acid such as hydrogen chloride or hydrogen bromide, varies considerably with changes in any of several reaction conditions. There have also been discovered the following new steps and reaction conditions, which combination of steps and conditions results in a more rapid reaction, or a higher yield of the corresponding tertiary-butylphenol, than is otherwise obtainable.

(a) The most favorable reaction temperatures are from 100° to 125° C., although reaction temperatures of from 100° to 150° C. are operable.

(b) The iron halide, i. e. the iron chloride, or iron bromide, or mixtures thereof, should be employed in amount corresponding to from $0.58 \times 10^{-4}$ to $16 \times 10^{-4}$ molecular proportion of the iron halide per mole of the phenol initially used, and in conjunction with hydrogen chloride, or hydrogen bromide, or mixtures thereof, in amount corresponding to at least $2.6 \times 10^{-3}$, usually from $2.6 \times 10^{-3}$ to $15 \times 10^{-3}$, molecular proportion of the hydrohalic acid per mole of the phenol starting material.

The phenol reactant, having a hydrogen atom in at least one of the positions ortho and para to the hydroxyl group, and the diisobutylene should be employed in the relative proportions of at least 3, preferably from 3 to 10, moles of said phenol per mole of the diisobutylene. The reaction should be carried out in the absence, or substantial absence, of solvents or diluents other than the agents involved in the reaction, and under anhydrous or substantially anhydrous conditions. The invention concerns a process wherein the entire combination of reaction conditions just set forth are employed, and pertains especially to a process wherein the reaction is carried out under the reaction conditions set forth in items (a) and (b).

Any phenol which is unsubstituted, except by hydrogen, in at least one of the positions ortho or para to the hydroxyl group, may be employed as a starting material in the process. Examples of suitable phenols are phenol itself, ortho-cresol, metal-cresol, ortho-chlorophenol, ortho-bromophenol, ortho-phenylphenol, meta-phenylphenol, ortho-ethylphenol, ortho-isopropylphenol, and 2,6-dichlorophenol.

It may be mentioned that the reaction of diisobutylene as herein described with a phenol having a hydrogen atom in the para-position, such as when the phenol reactant is phenol itself, or a phenol which contains a substituent group or groups on the aromatic nucleus adjacent to the hydroxyl group, the reaction usually proceeds toward the formation of a corresponding para-tertiary-butylphenol. Thus, phenol reacts to form para-tertiary-butylphenol and ortho-cresol reacts to form 4-tertiary-butylorthocresol.

The process is carried out by mixing one or more of the iron halides, preferably ferric chloride, and the phenol starting material, together with hydrogen bromide, or hydrogen chloride, in the desired proportions, in a suitable reaction vessel, provided with a stirrer and pipe coils or a jacket for introducing heat to, or withdrawing heat from, the charge. The mixture is stirred and heated to a reaction temperature of from 100° to 150° C., preferably from 100° to 125° C. The diisobutylene is preferably introduced gradually in the desired proportion, after which the resulting mixture is stirred and heated at the above reaction temperatures, suitably for a period of from two to six hours or longer, to complete the reaction, i. e. to convert the corresponding tertiary-octylphenol initially formed in the reaction to a tertiary-butylphenol. The reaction is discontinued when a substantial proportion, e. g. 15 percent by weight or more, preferably when from 50 to 75 percent of the initial reaction product of the diisobutylene and the phenol is converted to a tertiary-butylphenol. Further heating to convert a larger proportion of the intermediate product, e. g. tertiary-octylphenol, into the desired tertiary-butylphenol usually results in a decrease in purity of the latter.

The reaction is usually carried out at atmospheric pressure, but may be carried out at in a closed reactor under elevated pressures, e. g. at superatmospheric pressures of from 2 to 30 pounds per square inch.

Upon discontinuing the reaction, the catalyst materials, i. e. the iron halide and the hydrohalic acid, are neutralized by treating the reaction mixture with an alkali such as sodium hydroxide, potassium hydroxide, sodium carbonate, or potassium carbonate, or an aqueous solution of an alkali such as an aqueous 50 weight percent solution of sodium hydroxide. The neutralized reaction mixture is usually fractionally distilled to recover and separate the unreacted phenol starting material, the corresponding tertiary-butylphenol product, and by-products, e. g. the corresponding tertiary-octylphenol, from one another, and from the residue. The unreacted phenol starting material may be reused in succeeding reactions. By-products of the reaction, e. g. a corresponding tertiary-octylphenol, recovered in the process may also be recycled to succeeding reactions and employed to form a further amount of the corresponding tertiary-butylphenol product.

In a prefered practice, the reaction is carried out by introducing hydrogen chloride into the liquid phenol in admixture with from $0.58 \times 10^{-4}$ to $16 \times 10^{-4}$ mole of ferric chloride or ferrous bromide per mole of the phenol until the liquid phenol starting material is saturated or is substantially saturated with the hydrogen chloride, usually until the mixture contains an amount of the hydrogen chloride corresponding to from $2.6 \times 10^{-3}$ to $15 \times 10^{-3}$ mole of the hydrogen chloride per mole of the phenol starting material. The mixture of the phenol containing the catalyst materials, e. g. ferric chloride and the HCl in the aforementioned proportions, is fed to a reaction vessel and into admixture with diisobutylene in the relative proportions of from 3 to 10 moles of the phenol reactant per mole of the diisobutylene. The resulting mixture is heated at a reaction temperature of from 100° to 150° C., preferably from 100° to 125° C., for a time of from two to six hours or longer, suitably with agitation to effect a reaction of the diisobutylene with the phenol and form a corresponding tertiary-butylphenol. The reaction mixture is withdrawn from the vessel, is neutralized with an alkali and is fractionally distilled to recover and separate the unreacted phenol starting material, the tertiary-butylphenol product and higher boiling by-products of the reaction, e. g. a corresponding tertiary-octylphenol, from one another and from the residue. The unreacted phenol starting material and higher boiling by-products of the reaction recovered in the process may be recycled to succeeding reactions to form a further amount of a corresponding tertiary-butylphenol.

The accompanying drawing is a flow sheet illustrating the sequence of steps in the process as just described.

The following examples illustrate ways in which the principle of the invention has been applied, but are not to be construed as limiting the invention.

*Example 1*

A charge of 282.3 grams (3 moles) of a batch of dry phenol, having a freezing point of 40.8° C., together with 0.14 gram ($8.7 \times 10^{-4}$ mole) of anhydrous ferric chloride, was placed in a glass reaction vessel equipped with a reflux condenser and stirrer. The mixture was stirred and heated to a temperature of 118° C. while adding 0.42 gram ($11.5 \times 10^{-3}$ mole) of dry HCl gas to the liquid. Thereafter, 56.1 grams (0.5 mole) of diisobutylene was added dropwise over a period of 24 minutes while maintaining the mixture at a reaction temperature between 115° and 120° C. After adding the diisobutylene, the resulting mixture was stirred and heated at a reaction temperature between 115° and 120° C. over a period of 2 hours. The mixture was neutralized by adding 0.5 cc. of an aqueous solution containing 50 percent by weight of sodium hydroxide and was fractionally distilled. There were obtained 211.5 grams of unreacted phenol, 90.4 grams of 4-tertiary-butylphenol, 32.4 grams of 4-tertiary-octylphenol and 3.4 grams of residue. The 4-tertiary-butylphenol had a freezing point of 96.4° C. The product was soluble in a hot aqueous solution containing 10 percent by weight of sodium hydroxide to form a clear colorless solution. The yield of the 4-tertiary-butylphenol was 60 percent based on the diisobutylene initially used.

In contrast, when a charge of 3 gram moles of the phenol and 0.5 gram mole of the diisobutylene are reacted with one another in the presence of 3.5 grams ($9.6 \times 10^{-2}$ mole) of dry HCl under similar time and temperature conditions, the product is 4-tertiary-octylphenol. No 4-tertiary-butylphenol is obtained.

When a charge of 3 gram moles of the phenol and 0.5 gram mole of the diisobutylene are reacted with one another in the presence of 0.14 gram ($8.7 \times 10^{-4}$ mole) of anhydrous ferric chloride, under similar time and temperature conditions, the product is 4-tertiary-octylphenol. No 4-tertiary-butylphenol is obtained.

*Example 2*

A charge of 282.3 grams (3 moles) of the batch of the phenol described in Example 1, together with 0.185 gram ($8.6 \times 10^{-4}$ mole) of anhydrous ferrous bromide was placed in a glass reaction flask equipped with a reflux condenser and stirrer. The mixture was stirred and heated to a temperature of 120° C. Thereafter 0.93 gram ($11.5 \times 10^{-3}$ mole) of dry HBr gas was added to the liquid. A charge of 56.1 grams (0.5 mole) of diisobutylene was added dropwise over a period of 15 minutes while stirring and maintaining the mixture at a temperature between 115° and 120° C. After all of the diisobutylene was added, the resulting mixture was stirred and heated at a temperature of from 115° to 120° C. for a period of 2 hours. The mixture was neutralized by adding 0.5 cc. of an aqueous solution containing 50 percent by weight of sodium hydroxide, and was fractionally distilled. There were obtained 203.6 grams of unreacted phenol, 104.4 grams of 4-tertiary-butylphenol, 18.2 grams of 4-tertiary-octylphenol, and 6.3 grams of residue. The 4-tertiary-butylphenol had a freezing point of 96.1° C. The yield of said product was 68.8 percent, based on the diisobutylene initially used.

In contrast, when a charge of 3 gram moles of phenol and 0.5 gram mole of the diisobutylene are reacted with one another in the presence of 0.185 gram ($8.6 \times 10^{-4}$ mole) of anhydrous ferrous bromide under the same time and temperature conditions, the product is 4-tertiary-octylphenol. No 4-tertiary-butylphenol is obtained.

*Example 3*

A charge of 282.3 grams (3 moles) of the batch of the phenol described in Example 1, together with 0.028 gram ($1.68 \times 10^{-4}$ mole) of anhydrous ferric chloride was placed in a glass reaction flask equipped with a reflux condenser and stirrer. The mixture was stirred and heated to a temperature of 115° C. while introducing 0.42 gram ($11.5 \times 10^{-3}$ mole) of dry HCl gas into the liquid. Thereafter, 56.1 grams (0.5 mole) of diisobutylene was added dropwise over a period of 18 minutes. After adding all of the diisobutylene, the mixture was stirred and heated at a temperature of from 115°–120° C. for a period of 2 hours. The reaction mixture was neutralized by adding 0.5 cc. of an aqueous solution containing 50 percent by weight of sodium hydroxide and was fractionally distilled to recover the product. There were obtained 230 grams of unreacted phenol, 23.4 grams of 4-tertiary-butylphenol, 79 grams of 4-tertiary-octylphenol and 4 grams of residue. The yield of 4-tertiary-butylphenol was 15.7 percent based on the diisobutylene initially used. The yield of 4-tertiary-octylphenol was 76.8 percent.

*Example 4*

A charge of 4545 grams (48.2 moles) of liquid phenol together with 4.5 grams (0.028 mole) of anhydrous ferric chloride was placed in a jacketed reaction vessel equipped with a stirrer. The mixture was stirred and heated at a temperature of 60° C. The vessel was flushed with HCl gas to remove air, then closed and 22 grams (0.6 mole) of HCl gas introduced through a valved opening. The pressure within the vessel was 5 pounds per square inch, gauge. The mixture was stirred and heated to a temperature of 115° C. under pressure. A charge of 897 grams (8 moles) of diisobutylene was added over a period of 34 minutes while stirring and maintaining the mixture at reaction temperatures of from 112° to 116° C. After adding the diisobutylene the mixture was stirred and heated at temperatures between 112° and 117° C. for a period of 2 hours longer. The pressure was released and a portion consisting of 340 grams of the batch of the crude product was removed. It was neutralized with 1 cc. of an aqueous 50 weight percent solution of sodium hydroxide and was fractionally distilled. There were obtained 213.9 grams of unreacted phenol, 101.3 grams of para-tertiary butylphenol and 24.8 grams of residue, principally para-tertiary-octylphenol. The crude product contained 62.8 percent by weight of unreacted phenol 29.9 percent of para-tertiary-butylphenol and 7.3 percent of tertiary-octylphenol. The para-tertiary-butylphenol had a freezing point of 96.2° C., and was obtained in amount corresponding to a yield of 68.2 percent based on the diisobutylene initially used.

*Example 5*

A charge of 4545 grams (48.2 moles) of phenol, together with 11.3 grams (0.07 mole) of anhydrous ferric chloride was placed in a jacketed reaction vessel equipped with a stirrer. The mixture was stirred and heated at a temperature of 60° C. The vesel was flushed with HCl gas to remove air, then closed and 22 grams (0.6 mole) of dry HCl gas introduced through a valved inlet. The pressure within the vessel was 5 pounds per square inch, gauge. The mixture was stirred and heated at a temperature of 100° C. A charge of 897 grams (8 moles) of diisobutylene was added over a period of 37 minutes. The resulting mixture was stirred and maintained at a temperature of 100° C. for a period of 2 hours. Thereafter, the pressure was released. A portion consisting of 340 grams of the batch of the crude product was removed from the reaction vessel, neutralized with 1.5 cc. of an aqueous 50 weight percent solution of sodium hydroxide, and was fractionally distilled. There were obtained 7.2 grams of a forefraction boiling at temperatures up to 88° C. at 25 millimeters absolute pressure (principally water and phenol), 197.9 grams of phenol boiling at 88°–100° C. at 25 millimeters, 13.6 grams of an intermediate fraction boiling at 100°–133° C. at 25 millimeters, 82.1 grams of para-tertiary-butylphenol boiling at 133°–135° C. at 25 millimeters, and 39.2 grams of higher boiling residue, principally tertiary-octylphenol. The para-tertiary-butylphenol boiling at temperatures of from 133°–135° C. at 25 millimeters had a freezing point of 96.7° C. The yield of said product was 54 percent, based on the diisobutylene initially used.

*Example 6*

A charge of 4545 grams (48.3 moles) of liquid phenol, together with 11.3 grams (0.07 mole) of anhydrous ferric chloride was placed in a pressure-resistant vessel. The mixture was stirred and heated at a temperature of 60° C. while introducing 20 grams (0.55 mole) of dry HCl gas, then heated to a temperature of 145° C. A charge of 897 grams (8 moles) of diisobutylene was added over a period of 39 minutes while stirring and maintaining the mixture at temperatures of from 145° to 150° C. After adding the diisobutylene, the mixture was stirred and heated at 150° C. for 4 hours, then cooled to 100° C. and stirred for 4 hours longer. The pressure was released and the mixture removed from the vessel. A portion, consisting of 340 grams of the crude product, was placed in a distilling flask. It was neutralized with 1.5 cc. of an aqueous 50 percent by weight solution of sodium hydroxide and was fractionally distilled. There were obtained 4.6 grams of a forefraction boiling at temperatures up to 88° C. at 25 millimeters absolute pressure, 192.2 grams of unreacted phenol boiling at 88°–100° C. at 25 millimeters, 0.5 gram of an intermediate fraction boiling at 100°–115° C. at 25 millimeters, 5.3 grams of mono-tertiary-butylphenol boiling at 115°–134° C. at 25 millimeters, 122 grams of mono-tertiary-butylphenol (principally para-tertiary-butylphenol) boiling at 134–136° C. at 25 millimeters 4.5 grams of mono-tertiary-butylphenol boiling at 136°–140° C. at 25 millimeters, 1.8 grams of liquid boiling at 140°–160° C. at 25 millimeters and 8.4 grams of residue. The still loss was 0.7 gram. The yield of mono-tertiary-butylphenol corresponds to 87.5 percent based on the diisobutylene initially used.

*Example 7*

A charge of 309 grams (2.4 moles) of 2-chlorophenol, together with 0.46 gram ($28.3 \times 10^{-4}$ mole) of ferric chloride, was placed in a glass reaction flask equipped with a reflux condenser and stirrer. The mixture was stirred and heated to a temperature of 115° C., and 0.31 gram of dry HCl gas added to the liquid. Thereafter, 44.8 grams (0.4 mole) of diisobutylene was added over a period of 17 minutes, together with 0.17 gram of HCl, while stirring and maintaining the mixture at temperatures of from 115 to 120° C. After adding the diisobutylene the mixture was stirred and heated at temperatures of from 115°–120° C. over a period of 2 hours while introducing a further 0.09 gram of HCl, then stirred for 4 hours longer and cooled. A total of 0.57 gram ($15.9 \times 10^{-3}$ mole) of HCl was employed in the reaction. The reaction mixture was neutralized with 1.5 cc. of an aqueous 50 percent by weight solution of sodium hydroxide and was fractionally distilled. There were obtained 15.2 grams of unreacted diisobutylene and 287.4 grams of unreacted 2-chlorophenol boiling at temperatures up to 122° C. at 25 millimeters absolute pressure, 7 grams of an intermediate fraction boiling at 122°–130° C. at 25 millimeters, 11.5 grams of 2-chloro-4-tertiary-butylphenol boiling at 130°–135° C. at 25 millimeters, 2.4 grams of an intermediate fraction boiling at 135°–150° C. at 25 millimeters, 18 grams of liquid by-products boiling at 150°–177° C. at 25 millimeters, and 9 grams of residue. The 2-chloro-4-tertiary-butylphenol product was a colorless liquid.

*Example 8*

A charge of 292 grams (2.7 mole) of ortho-cresol, together with 0.44 gram ($27 \times 10^{-4}$ mole) of anhydrous ferric chloride was placed in a glass reaction vessel equipped with a reflux condenser and stirrer. The mixture was stirred and heated to a temperature of 115° C., and 0.33 gram of dry HCl gas added to the liquid. Thereafter, 50.5 grams (0.45 mole) of diisobutylene was added dropwise over a period of 21 minutes and at the same time 0.07 gram of dry HCl gas was introduced into the liquid while maintaining the mixture at a reaction temperature between 115° and 118° C. The reaction mixture was stirred and heated at temperatures of from 115° to 118° C., while adding a further 0.39 gram of HCl over a period of 2 hours, then stirred for approximately fours hours longer and cooled. A total of 0.79 gram ($21.7 \times 10^{-3}$ mole) of HCl was employed in the reaction. The reaction mixture was neutralized with 1.5 cc. of an aqueous 50 percent by weight solution of sodium hydroxide and was fractionally distilled. There were obtained 224.2 grams of unreacted ortho-cresol boiling at temperatures of from 95° to 108° C. at 25 millimeters absolute pressure, 2.2 grams of an intermediate fraction boiling at 102°–138° C. at 25 millimeters, 50.8 grams of 4-tertiary-butyl-ortho-cresol boiling at 138°–145° C. at 25 millimeters, 3.7 grams of an intermediate fraction boiling at 145°–168° C. at 25 millimeters, 5.4 grams of by-products boiling at 168°–180° C. at 25 millimeters and 5.8 grams of residue. The 4-tertiary-butyl-ortho-cresol was a colorless liquid. It was soluble in an aqueous 10 percent by weight solution of sodium hydroxide.

*Example 9*

A charge of 276 grams (1.62 moles) of ortho-phenyl-phenol, together with 0.41 gram ($25 \times 10^{-4}$ moles) of ferric chloride, was placed in a glass reaction vessel equipped with a reflux condenser and stirrer. The mixture was stirred and heated to a temperature of 115° C., and 0.22 gram of dry HCl gas added to the liquid. Thereafter, 31 grams (0.27 mole) of diisobutylene was added over a period of 15 minutes, together with 0.36 gram of dry HCl, while stirring and maintaining the mixture at temperatures between 115° and 120° C. After adding the diisobutylene the mixture was stirred and heated at temperatures of from 115° to 120° C. over a period of 1 hour while introducing a further 0.3 gram of HCl, then stirred for 5 hours longer and cooled. A total of 0.88 gram ($24 \times 10^{-3}$ mole) of HCl was employed in the reaction. The reaction mixture was neutralized with 2.2 grams of an aqueous 50 percent by weight solution of sodium hydroxide and was fractionally distilled. There were obtained 199.1 grams of unreacted ortho-phenyl-phenol boiling at temperatures of from 167° to 176° C. at 25 millimeters absolute pressure, 16.7 grams of an intermediate fraction boiling at 176°–201° C. at 25 millimeters, 64.4 grams of 4-tertiary-butyl-ortho-phenylphenol boiling at 201°–208° C. at 25 millimeters, 20 grams of liquid by-products boiling at 208°–240° C. at 25 millimeters and 6 grams of residue. The 4-tertiary-butyl-ortho-phenylphenol product was a colorless liquid.

*Example 10*

A charge of 292 grams (2.7 moles) of meta-cresol having a melting point of 11° C., together with 0.44 gram of ferric chloride was placed in a glass reaction flask equipped with a reflux condenser and stirrer. The mixture was stirred and heated to a temperature of 119° C. while introducing 0.175 gram of dry HCl into the liquid. Thereafter, 50.5 grams (0.45 mole) of diisobutylene was added over a period of 12 minutes while adding a further 0.175 gram of dry HCl. The mixture was stirred and heated at temperatures of from 115° to 120° C. while continuing the slow addition of HCl for another hour. A total of 0.58 gram of dry HCl was added to the reaction mixture. Stirring and heating of the mixture at temperatures of from 115° to 120° C. was continued for a period of 6 hours, after addition of the diisobutylene. Thereafter, the mixture was neutralized with 1 cc. of an aqueous 50 percent by weight solution of sodium hydroxide and was fractionally distilled. There were obtained 323 grams of a forefraction boiling at temperatures of 103°–110° C. at 25 millimeters absolute pressure, 14.5 grams of an intermediate fraction boiling at 110°–133° C. at 25 millimeters, 55.6 grams of 6-tertiary-butyl-meta-cresol boiling at 133°–140° C. at 25 millimeters, 18.2 grams of liquid by-products boiling at 140°–190° C. and 8 grams of residue. The 6-tertiary-butyl-meta-cresol, was a colorless liquid having a freezing point of approximately 18° C.

*Example 11*

A charge of 150.6 grams (3 moles) of m-phenylphenol, together with 0.77 gram of ferric chloride was placed in a glass reaction vessel equipped with a reflux condenser and stirrer. The mixture was stirred and heated to a temperature of 116° C. while introducing 0.26 gram of dry HCl gas into the liquid. Thereafter, 56.1 grams (0.5 mole) of diisobutylene was added over a period of 20 minutes while adding a further 0.22 gram of HCl to the mixture. After adding the diisobutylene, the addition of HCl was continued at a slow rate over a period of 1 hour while stirring and heating the mixture at a temperature of from 116° to 120° C. A total of 1.02 grams of dry HCl gas was fed to the reaction. The mixture was stirred and heated at temperatures between 116° and 120° C. for 5 hours longer, then neutralized with 1.5 cc. of an aqueous 50 percent by weight solution of sodium hydroxide and fractionally distilled. There were obtained 393.6 grams of m-phenylphenol boiling at temperatures of from 203° to 225° C. at 25 millimeters absolute pressure, 11.5 grams of an intermediate fraction boiling at 225°–235° C. at 25 millimeters, 112.1 grams of mono-x-tertiary-butyl-meta-phenylphenol boiling at 235°–240° C. at 25 millimeters, 30.9 grams of liquid by-products boiling at 200°–230° C. at 5 millimeters and 12.8 grams of residue. The mono-tertiary-butyl-meta-phenylphenol product was a crystalline substance having a freezing point of 93°–94° C. The yield of said product was 49.5 percent based on the diisobutylene initially used.

We claim:

1. In a process for reacting diisobutylene with a phenol in the presence of an acid-acting condensing agent to form a corresponding tertiary-butylphenol product, the steps of introducing one molecular proportion of diisobutylene into admixture with at least 3 molecular proportions of a phenol having a hydrogen atom attached to at least one of the carbon atoms of the aromatic nucleus ortho and para to the hydroxyl group at a reaction temperature of from 100° to 150° C. in the presence of a catalyst mixture composed of at least one iron halide selected from the group consisting of ferric chloride, ferric bromide, ferrous chloride and ferrous bromide, in amount corresponding to from $0.58 \times 10^{-4}$ to $16 \times 10^{-4}$ mole of the iron halide per mole of the phenol starting material and a hydrohalic acid selected from the group consisting of hydrogen chloride and hydrogen bromide, in amount corresponding to at least $2.6 \times 10^{-3}$ mole of the hydrohalic acid per mole of said phenol, thereafter treating the mixture with an alkali in amount sufficient to neutralize the catalyst and subjecting the resulting mixture to fractional distillation to separate the tertiary-butylphenol product therefrom.

2. In a process for making a tertiary-butylphenol, the steps of introducing one molecular proportion of diisobutylene into admixture with at least 3 moles of a phenol having a hydrogen atom attached to at least one of the carbon atoms of the aromatic nucleus ortho and para to the hydroxyl group at a reaction temperature of from 100° to 150° C. in the presence of a catalyst mixture composed of at least one iron halide selected from the group consisting of ferric chloride, ferric bromide, ferrous chloride and ferrous bromide, in amount corresponding to from $0.58 \times 10^{-4}$ to $16 \times 10^{-4}$ mole of the iron halide per mole of the phenol starting material, and at least one hydrohalic acid selected from the group consisting of hydrogen chloride and hydrogen bromide, in amount corresponding to from $2.6 \times 10^{-3}$ to $15 \times 10^{-3}$ mole of the hydrohalic acid per mole of said phenol, and heating the mixture at a temperature of from 100° to 150° C., until at least 15 percent of the initial reaction product of the diisobutylene and said phenol is converted to a corresponding tertiary-butylphenol product, thereafter treating the mixture with an alkali in amount sufficient to neutralize the catalyst and subjecting the resulting mixture to fractional distillation to separate the tertiary-butylphenol product therefrom.

3. A process for making a tertiary-butylphenol which comprises introducing one molecular proportion of diisobutylene into admixture with from 3 to 10 molecular proportions of a phenol having a hydrogen atom attached to at least one of the carbon atoms of the aromatic nucleus ortho and para to the hydroxyl group at a reaction temperature of from 100° to 125° C. in the presence of a catalyst mixture composed of at least one iron halide selected from the group consisting of ferric chloride, ferric bromide, ferrous chloride and ferrous bromide, in amount corresponding to from $0.58+10^{-4}$ to $16\times10^{-4}$ mole of the iron halide per mole of the phenol starting material, and at least one hydrohalic acid selected from the group consisting of hydrogen chloride and hydrogen bromide, in amount corresponding to from $2.6\times10^{-3}$ to $15\times10^{-3}$ mole of the hydrohalic acid per mole of said phenol, heating the mixture at a temperature of from 100° to 125° C. until from 50 to 75 percent of the initial reaction product of the diisobutylene and said phenol is converted to a corresponding tertiary-butylphenol, thereafter treating the mixture with an alkali in amount sufficient to neutralize the catalyst and subjecting the resulting mixture to fractional distillation to separate the tertiary-butylphenol product therefrom.

4. A process as described in claim 3, wherein the iron halide is ferrous bromide and the hydrohalic acid is hydrogen bromide.

5. A process as described in claim 3, wherein the iron halide is ferric chloride and the hydrohalic acid is hydrogen chloride.

6. A process according to claim 3, wherein the iron halide is ferric chloride and the phenol starting material is ortho-phenylphenol.

7. A process according to claim 3, wherein the hydrohalic acid is hydrogen chloride and the phenol starting material is cresol.

8. A process according to claim 5, wherein the phenol starting material is 2-chlorophenol.

9. A process for making para-tertiary-butylphenol which comprises introducing one molecular proportion of diisobutylene into admixture with from 3 to 10 molecular proportions of phenol at a reaction temperature of from 100° to 125° C. in the presence of a catalyst mixture composed of from $0.58\times10^{-4}$ to $16\times10^{-4}$ mole of ferric chloride per mole of the phenol and from $2.6\times10^{-3}$ to $15\times10^{-3}$ mole of hydrogen chloride per mole of the phenol, heating the mixture at a temperature of from 100° to 125° C. until from 50 to 75 percent of the initial reaction product of the diisobutylene and the phenol is converted to para-tertiary-butylphenol, thereafter treating the mixture with sodium hydroxide in amount sufficient to neutralize the catalyst and subjecting the resulting mixture to fractional distillation to separate the tertiary-butylphenol product therefrom.

10. A process for making para-tertiary-butylphenol which comprises introducing one molecular proportion of diisobutylene into admixture with from 3 to 10 molecular equivalent proportions of phenol at a reaction temperature of from 100° to 125° C. in the presence of a catalyst mixture composed of from $0.58\times10^{-4}$ to $16\times10^{-4}$ mole of ferric chloride per mole of the phenol starting material and from $2.6\times10^{-3}$ to $15\times10^{-3}$ mole of hydrogen chloride per mole of said phenol, heating the mixture at a temperature of from 100° to 125° C. until from 50 to 75 percent of the initial reaction product of the diisobutylene and the phenol is converted to para-tertiary-butylphenol, then neutralizing the reaction mixture with an alkali, fractionally distilling the resetting mixture to separate the para-tertiary-butylphenol and the tertiary-octylphenol and feeding the tertiary-octylphenol to a succeeding reaction.

References Cited in the file of this patent
UNITED STATES PATENTS

| | | |
|---|---|---|
| 2,091,565 | Perkins et al. | Aug. 31, 1937 |
| 2,332,555 | Buc | Oct. 26, 1943 |

UNITED STATES PATENT OFFICE

CERTIFICATE OF CORRECTION

Patent No. 2,784,239                                                            March 5, 1957

Andrew J. Dietzler et al.

It is hereby certified that error appears in the printed specification of the above numbered patent requiring correction and that the said Letters Patent should read as corrected below.

Column 10, line 30, for "resetting" read -- resulting --.

Signed and sealed this 24th day of September 1957.

(SEAL)

Attest:
KARL H. AXLINE
Attesting Officer

ROBERT C. WATSON
Commissioner of Patents